United States Patent [19]

Kitazawa et al.

[11] 4,115,822
[45] Sep. 19, 1978

[54] AUTOMATIC START AND SHUT-OFF APPARATUS FOR MAGNETIC-TAPE SOUND RECORDER

[75] Inventors: Kunihiko Kitazawa; Masuichiro Mimura; Mitsuo Iwata, all of Yokohama, Japan

[73] Assignee: Victor Company of Japan, Limited, Japan

[21] Appl. No.: 755,056

[22] Filed: Dec. 28, 1976

[30] Foreign Application Priority Data

Dec. 29, 1975 [JP] Japan .................. 51-176583[U]
Dec. 30, 1975 [JP] Japan .................. 50-178303[U]

[51] Int. Cl.² ........................................ G11B 15/48
[52] U.S. Cl. ................................ 360/74; 360/62
[58] Field of Search .............. 360/62, 74, 96, 137

[56] References Cited

U.S. PATENT DOCUMENTS

| | | | |
|---|---|---|---|
| 3,765,685 | 10/1973 | Harlan et al. | 360/62 |
| 3,779,498 | 12/1973 | Takashino | 360/74 |
| 3,821,800 | 6/1974 | Maltese | 360/62 |
| 3,834,651 | 9/1974 | Hashizume | 360/96 |
| 3,883,893 | 5/1975 | Ueki | 360/74 |
| 3,932,889 | 1/1976 | Takeda | 360/74 |
| 4,000,517 | 12/1976 | Brickerd, Jr. | 360/74 |
| 4,018,404 | 4/1977 | Sami | 360/74 |

*Primary Examiner*—Jay P. Lucas
*Attorney, Agent, or Firm*—Lowe, King, Price & Becker

[57] ABSTRACT

In a magnetic-tape sound recorder including mode-selecting and selected mode holding means for selecting a desired mode out of a plurality of modes of operation and holding the selected mode until the mode is to be cleared, an automatic start and shut-off apparatus comprising locking means for holding the operational component parts of the recorder in a locked condition until the locking condition is automatically terminated. Also provided in the apparatus is an unlatching means operative to clear the selected mode in the mode-selecting and selected mode holding means. Motion translating means between the locking and unlatching means holds the unlatching means disengaged from the mode-selecting and selected-mode holding means when the locking means is operative to hold the operational component parts in the locked conditions. Unlocking means connected to the unlatching means and engageable with the locking means is driven in response to (1) a first signal for making the locking means inoperative by the unlocking means and (2) a second signal for clearing the selected mode of operation in the mode-selecting and selected-mode holding means. The operational component parts include a pressing roller associated with the capstan for driving the reels carrying the magnetic tape so that the pressing roller is spaced apart from the capstan when the locking means is held operative.

13 Claims, 9 Drawing Figures

AUTOMATIC START AND SHUT-OFF APPARATUS FOR MAGNETIC-TAPE SOUND RECORDER

The present invention relates generally to magnetic tape sound recorders and in particular to an automatic start and shut-off apparatus for use in a magnetic-tape sound recorder.

Operating a tape recorder in a preselected mode while one is not available during the operation is made possible by the use of a timer switch which triggers the recorder at a preset time. Such preset timed operation permits the user to record a transmitted favorite program while he is absent and enables him to listen to the recorded material at a later time. Conventionally, the tape recorder is placed in a preset or record mode while at the same time the timer is adjusted to a desired preset time. Under these circumstances, the pinch or pressing roller forming part of the tape drive mechanism of the recorder is kept in a tape transport engagement with the tape feed capstan of the mechanism until the motor that drives the capstan is energized at the preset time. The contacting surface of the pressing roller is usually formed of a resilient material. If the standby time continues over a prolonged period of time, deformation would occur on the resilient surface and the surface area of the roller which contacts the tape is varied around its circumference. This causes fluctuations in the tape transport speed so that the recorded material will contain an appreciable degree of wow and flutter. This problem can be overcome with the use of a locking mechanism which maintains the pressing roller in a position disengaged from contact with the capstan until the preset time.

A cassette-type magnetic-tape sound recorder is usually provided with an end-of-tape sensor which detects the end of the tape in use, automatically de-energizes the motor and restores the recorder to the original condition.

The locking and end-of-tape sensor mechanisms of a prior-art cassette-type magnetic-tape sound recorder include drive and release means respectively proper to such mechanisms and for this reason give rise to an increase in the production cost of the recorder as a whole. Cassette-type magnetic-tape sound recorders operable for the above described specific purpose have therefore been limited to those which are equipped with such costly mechanisms and accordingly to the recorders of the medium to high classes.

It is, accordingly, an important object of the present invention to provide an automatic start and shut-off apparatus for a magnetic-tape sound recorder which is operable for the automatically starting a desired mode of operation in the recorder at a prescribed time and automatically terminating the operation in the selected mode either at a prescribed time or in response to termination of the travel of the cassette tape installed in the recorder and which is simple in construction and economical to manufacture.

It is another important object of the present invention to provide an automatic start and shut-off apparatus for magnetic-tape sound recorder which apparatus is capable of automatically releasing the locked condition of the recorder or automatically bringing the recorder to a full stop at the end of the tape under the control of common driving and releasing means.

In accordance with the present invention, these objects will be accomplished basically in an automatic start and shut-off apparatus for a cassette-type magnetic-tape sound recorder having a plurality of modes of operation, including manually operable mode-selecting and selected-mode holding means for selecting one of the modes of operation. The mode-selecting and selected-mode holding means have a first condition operative to hold the selected mode of operation and a second condition clearing the selected mode of operation. Locking means is provided having an operative condition holding operational component members of the sound recorder in locked conditions and an inoperative condition clearing the locked conditions. Also provided is unlatching means having a first condition engageable with the mode-selecting and selected-mode holding means and a second condition unengageable with the mode-selecting and selected-mode holding means, unlocking means connected to the unlatching means and having an operative condition to produce in the locking means the inoperative condition thereof and an inoperative condition disengaged from the locking means. The unlatching means further has in each of the first and second conditions thereof (1) an operative condition capable of producing in the mode-selecting and selected-mode holding means the second condition thereof and in the unlocking means the operative condition thereof and (2) an inoperative condition allowing the mode-selecting and selected-mode holding means to stay in the first condition thereof and holding the unlocking means in the inoperative condition thereof. Motion translating means intervening between and held in engagement with both of the locking means and the unlatching means for producing in the unlatching means the first and second conditions thereof in response to the inoperative and operative conditions, respectively, of the locking means. Also provided is power-operated actuating means having an operative condition producing in the unlatching means the operative condition thereof and an inoperative condition producing in the unlacthing means the inoperative condition thereof.

The locking means preferably comprises a slide plate movable between a first longitudinal limit position holding the aforesaid operational members in unlocked conditions and a second longitudinal limit position holding the operational members in the locked conditions. A locking member is rotatable on the slide plate about a fixed axis substantially perpendicular to the direction of movement of the slide plate between the first and second longitudinal limit positions thereof and is tiltable between a level position and an inclined position over the slide plate about an axis which is substantially perpendicular to the fixed axis. The locking member in the level position over the slide plate in the first longitudinal limit position has an unlocking angular position about the fixed axis for allowing the slide plate to move out of the first longitudinal limit position thereof and produces in the locking means the inoperative condition thereof. The locking member in the level position over the slide plate in the second longitudinal limit position has a locking angular position about the above mentioned fixed axis for being in locking engagement with the slide plate and producing in the locking the operative conditions thereof. The locking means member in the inclined position over the slide plate in the second longitudinal limit position allows the slide plate to be unlocked from the locking member and to move from the second longitudinal limit position into the first longitudinal limit position thereof. Biasing means urges the slide plate to move toward the first longitudinal limit position thereof.

The unlatching means preferably comprises a lever which is rotatable about a fixed axis between angular positions respectively producing in the unlatching means the operative and inoperative conditions thereof. The lever is tiltable about an axis substantially perpendicular to the fixed axis between angular positions respectively producing in the unlatching means the first and second conditions thereof. The lever has one longitudinal end portion engageable with the mode-selecting and selected-mode holding means and the other longitudinal end portion held in engagement with the motion translating means. First biasing means urges the lever to turn about the fixed axis of rotation thereof toward the angular position producing in the unlatching means the inoperative condition thereof, and second biasing means urging the lever to turn about the axis substantially perpendicular to the fixed axis of rotation thereof toward the angular position producing in the unlatching means the first condition thereof, the unlocking means being connected to the lever.

The unlocking means preferably comprises a lever rotatable about a fixed axis between first and second angular positions responsive to the operative and inoperative conditions, respectively, of the unlatching means. The lever is engageable with the locking means for producing in the locking means the operative and inoperative conditions thereof when turned into the first and second angular positions, respectively, thereof. Biasing means urges the lever to turn about the aforesaid fixed axis toward the second angular position thereof.

The motion translating means preferably comprises a lever rotatable about a fixed axis between first and second angular positions responsive to the inoperative and operative conditions, respectively, of the locking means. The lever is in engagement at one end with the locking means and at the other end with the unlatching means for producing in the unlatching means the first and second conditions thereof when turned into the first and second angular positions, respectively, thereof. Biasing means urges the lever to turn about the aforesaid fixed axis toward the first angular position thereof.

The actuating means preferably comprises a solenoid-operated actuator operatively connected to the unlatching means and comprising a solenoid coil associated with a solenoid core. A control circuit is responsive to a first signal by which the sound recorder is to be started for a selected mode of operation and to a second signal indicative of the termination of the travel of a magnetic tape incorporated into and in operation in the sound recorder. The control circuit produces in the actuating means the operative condition thereof in response to each of the first and second signals.

In this instance, the control circuit may comprise positive and negative bus lines connected across a d.c. power source through switch means, and voltage generating means for producing a d.c. voltage responsive to travelling condition of the magnetic tape operatively incorporated in the sound recorder. The control circuit also comprises first, second and third resistance-capacitance networks connected in parallel between the positive and negative bus lines and having respective predetermined time constants, the time constant of the second resistance-capacitance network being larger than the time constant of the first resistance-capacitance network and smaller than the time constant of the third resistance-capacitance network. A first transistor is serially connected through the aforesaid solenoid coil between the positive and negative bus lines. The first resistance-capacitance network includes a capacitor constituting a power source for the solenoid coil. The second resistance-capacitance network has an output terminal connected to the base of the first transistor, a second transistor being connected through the output terminal of the second resistance-capacitance network to the base of the first transistor for establishing a non-conduction state in the first transistor when the second transistor is conductive. The third resistance-capacitance network has an output terminal connected to the base of the second transistor, and a parallel combination of a switch and a capacitor connected between the bus lines. The switch is closed and open in response to the operative and inoperative conditions, respectively, of the above mentioned locking means. The output terminal of the voltage generating means and the input terminal of the third resistance-capacitance network are connected to the positive bus lines across the parallel combination of the capacitor and the switch.

The features and advantages of an apparatus according to the present invention will be more clearly understood from the following description taken in conjuction with the accompanying drawings, in which.

DETAILED DESCRIPTION OF THE PREFERRED EMBODIMENTS

Figure 1:
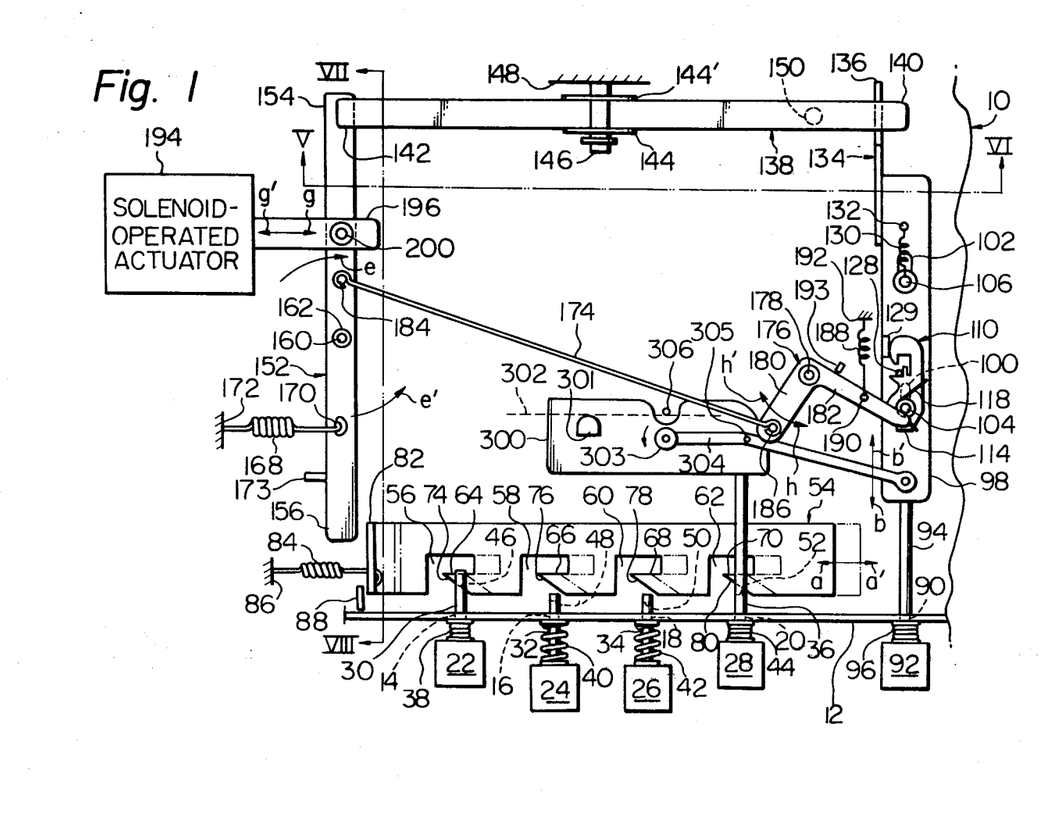
FIG. 1 is a plan view of part of an embodiment of the apparatus according to the present invention.

Referring first to FIG. 1 of the drawings, a cassette-type magnetic-tape sound recorder incorporating the automatic start and shut-off apparatus embodying the present invention is shown comprising a support or chassis 10 having an upstanding front end plate 12 which may be an integral portion of the chassis 10 or may be constituted by an independent member fixedly attached to the chassis 10. The front end plate 12 is formed with a plurality of holes or slots 14, 16, 18 and 20 and has mounted thereon push-buttons 22, 24, 26 and 28 by means of push rods or plates 30, 32, 34 and 36, respectively. The push rods or plates 30, 32, 34 and 36 are longitudinally movably passed through the holes or slots 14, 16, 18 and 20, respectively, in the front end plate 12 and project substantially perpendicularly to and inwardly of the front end plate 12. The push-buttons 22, 24, 26 and 28 are urged perpendicularly away from the outer face of the front end plate 12 by suitable biasing means such as helical compression springs 38, 40, 42 and 44, respectively, which are mounted between the outer face of the front end plate 12 and the respective push-buttons 22, 24, 26 and 28. The push-buttons 22, 24, 26 and 28 are herein assumed, for the sake of convenience, to be the record, rewind, fast-forward and playback push-buttons which are adapted to respectively produce recording, rewinding, fast-forward drive and playback modes of operation in the sound recorder when depressed. The playback push-button 28 in particular is also used to produce the recording mode of operation in cooperation with the record push-button 22. The terms "recording", "rewinding", "fast-forward drive" and "playback" modes of operation of magnetic-tape sound recorders in general are well known to those familiar with the art and will not be herein explained. The push rods 30, 32, 34 and 36 have formed in their respective free rear end portions, lateral slots 46, 48, 50 and 52 each of which is open in a direction parallel with the front end plate 12 as indicated by dotted lines. The slots 46, 48, 50 and 52 in the push rods 30, 32, 34 and 36 are located internally of the front end plate 12 without respect to the longitudinal positions of the push rods 46, 48, 50 and 52, respectively, relative to the front end plates 12.

Inside the front end plate 12 is positioned a latch plate 54 which is elongated and longitudinally movable back and forth in a direction substantially parallel with the front end plate 12 and is formed with recesses 56, 58, 60 and 62 which are open alongside the inner face of the front end plate 12 and which are respectively allocated to the push-buttons 22, 24, 26, 28 and 30. The latch plate 54 has generally wedge-shaped retainer portions 64, 66, 68 and 70 which project into the recesses 56, 58, 60 and 62 in a direction substantially parallel with the front end plate 12 and which have rewardly slanting guide edges 74, 76, 78 and 80, respectively. The guide edges 74, 76, 78 and 80 are inclined rearwardly away from the inner face of the front end plate 12 toward the respective leading ends of the retainer portions 64, 66, 68 and 70. The other edges of the retainer portions 64, 66, 68 and 70 meet the guide edges 74, 76, 78 and 80, respectively, at the respective leading ends of the retainer portions and extend substantially in parallel with the front end plate 12 as shown. Each of the push rods 30, 32, 34 and 36 has, relative to the latch plate 54, a forwardly retracted longitudinal position disengaged from the associated retainer portion 64, 66, 68 or 70 by the force of the associated compression spring 38, 40, 42 or 44 similarly to the push rods or plates 32 and 34 connected to the rewind and fastforward push buttons 24 and 26, respectively, shown in FIG. 1 and a fully protruded rearmost longitudinal position in locking engagement with the associated retainer portion 64, 66, 68 or 70 of the latch plate 54 with the retainer portion received in the slot 46, 48, 50 or 52 of the push rod or plate by the force of the associated compression spring 38, 40, 42 or 44 as in the cases of the push rods or plates 30 and 36 connected to the record and playback push-buttons 26 and 28 shown in FIG. 1.

The latch plate 54 has an upstanding edge portion 82 at one of its longitudinal ends and is urged to longitudinally move in the direction of arrow $a$, viz., leftwardly in FIG. 1 by suitable biasing means such as a helical tension spring 84 which is shown anchored at one end to the edge portion 82 of the latch plate 54 and at the other to a suitable stationary member or structure 86 fast on the chassis 10. A stop element 88 is fixedly mounted on the chassis 10 and is located in the path of the latch plate 54 so that the longitudinal movement of the latch plate 54 in the direction of the arrow $a$ is limited by abutting engagement of the upstanding edge portion 82 of the latch plate 54. Thus, the latch plate 54 has a first longitudinal limit position having the edge portion 82 in contact with the stop element 88 as indicated by full lines and a second longitudinal limit position moved a predetermined distance away from the stop element 88 in the direction of arrow $a'$ as indicated by dot-and-dash lines in FIG. 1. When the latch plate 54 is in the first longitudinal limit position thereof, the latch plate 54 has its retainer portions 64, 66, 68 and 70 held in positions respectively aligned with the push rods 30, 32, 34 and 36 of the push-buttons 22, 24, 26 and 28 in directions normal to the front end plate 12 and, when the latch plate 54 is in the second longitudinal limit position thereof, then the latch plate 54 has its retainer portions 64, 66, 68 and 70 located out of alignment with the push rods 30, 32, 34 and 36 and has the recess 56, 58, 60 and 62 aligned with the push rods 30, 32, 34 and 36, respectively, in the directions normal to the front end plate 12. When, thus, the latch plate 54 is in the first longitudinal limit position thereof and one of the push-buttons, for example, the rewind push-button 24 having the push rod or plate 32 in the forwardly retracted longitudinal position as illustrated in FIG. 1 is depressed against the force of the associated compression spring 40, the push rod 32 is brought into pressing engagement at its leading end with the slanting guide edge 76 of the retainer portion 66 of the latch plate 54 and forcibly moves the latch plate 54 in the direction of the arrow $a'$, viz., away from the stop element 88 against the force of the tension spring 84. The push rod 32 thus slides on the slanting guide edge 76 of the retainer portion 66 of the latch plate 54 until the leading of the push rod 32 reaches the leading end of the retainer portion 66. The push rod 32 now has its leading end portion located within the recess 58 in the latch plate 54 so that the latch plate 54 is in the second longitudinal limit position thereof as indicated by the dot-and-dash lines. As the push rod 32 is further moved rearwardly and reaches the previously mentioned fully protruded rearmost longitudinal position thereof, the slot 48 in the push rod 32 is laterally aligned with the retainer portion 66 and allows the retainer portion 66 to move into the slot 48 with the result that the latch plate 54 as a whole is moved back into the first longitudinal limit position thereof by the force of the tension spring 84. The push rod 66 is thus locked to the retainer portion 66 of the latch plate 54 by the forces of the compression and tension springs 40 and 84 similarly to the push rods 30 and 36 for the record and playback bush-buttons 22 and 28, respectively. If, under these conditions, the latch plate 54 is moved for a second time in the direction of the arrow a' and reaches the second longitudinal limit position thereof, the push rod 32 is brought into alignment with the recess 58 in the latch plate 54 and is disengaged from the retainer portion 66 of the plate 54 though not shown in the drawings. The push rod 32 is therefore retracted forwardly into the foremost longitudinal position thereof as indicated in FIG. 1 by the force of the compression spring 40. It is, in this instance, apparent that, if two or more push rods are in locking engagement with the latch plate 54 before the latch plate 54 is thus moved from the second longitudinal limit position thereof, all of such push rods or plates are disengaged from the latch plate 54 and are moved back into the respective foremost longitudinal positions thereof when the latch plate 54 is moved into the first longitudinal position thereof. The push-button and latch plate arrangements hereinbefore described constitute mode-selecting and selected-mode holding means of the magnetic-tape sound recorder incorporating the apparatus embodying the present invention. The mode-selecting and selected-mode holding means per se is well known in the art and further includes guide elements associated with the latch plate. These guide elements and other component parts associated with the push-buttons 22, 24, 26 and 28 and push rods 30, 32, 34 and 36 are not depicted in the drawings for clarity of illustration because they are well known in the art and because they are immaterial to the understanding of the essential features of the present invention.

Referring further to FIG. 1, the front end plate 12 is formed with another hole 90 sufficiently spaced apart from the closest one of the holes 14, 16, 18 and 20 in the plate 12 and has mounted thereon a fifth push-button 92 by a rod 94 which is axially movably passed through the hole 90 and projecting substantially perpendicularly to and inwardly of the front end plate 12. A helical compression spring 96 is mounted between the outer face of the front end plate 12 and the push-button 92 so that the push-button 92 is urged to move away from the outer face of the front end plate 12 and accordingly the rod 94 connected to the push-button 92 is urged to axially move forwardly over the inner face of the chassis 10. The push-button arrangement including the push-button 92, rod 94 and compression spring 96 form part of locking means of the embodiment of the apparatus according to the present invention and, thus, the push-button 92 will be hereinafter referred to as "pause" push-button.

Figure 2:
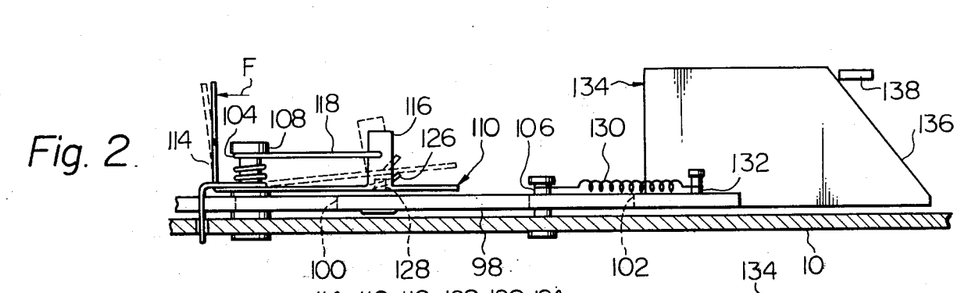
FIG. 2 is a side elevational view showing, partly in section, locking means forming part of the embodiment of FIG. 1.
Figure 3:
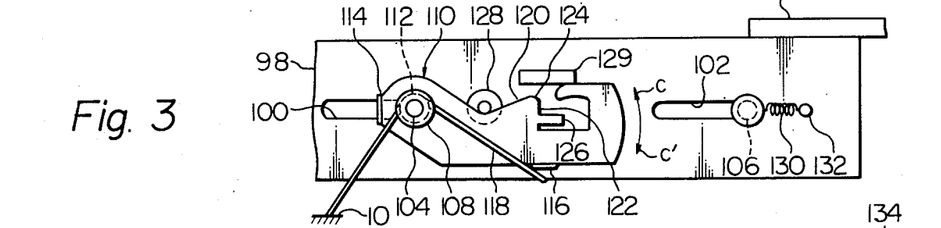
FIG. 3 is a plan view of part of the locking means shown in FIG. 2, the locking means being illustrated to be in an inoperative condition.
Figure 4:
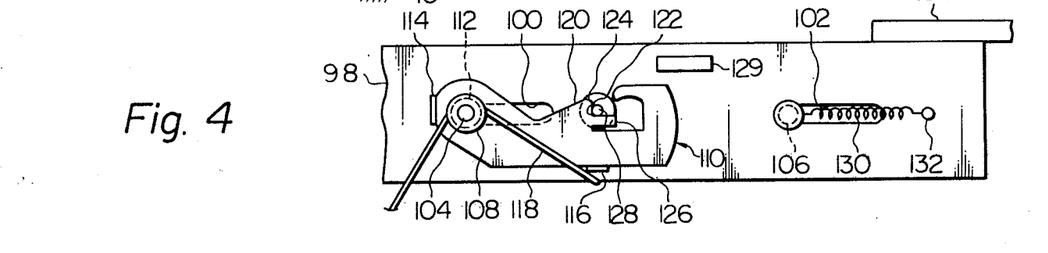
FIG. 4 is a view similar to FIG. 3 but shows the locking means in an operative condition.

The rod 94 is secured at its leading end to an elongated slide plate 98 longitudinally extending end movable over the chassis 10 in a direction substantially perpendicular to the front end plate 12. As will be better seen in FIGS. 2, 3 and 4, the slide plate 98 is formed with first and second guide slots 100 and 102 which are elongated longitudinally of the plate 98, viz., substantially perpendicularly to the front end plate 12 (FIG. 1) and which are open over the inner viz., upper face of the chassis 10. The chassis 10 has fixedly mounted thereon first and second stationary guide pins 104 and 106 which project perpendicularly from the inner or upper face of the chassis 10 and which are axially passed through the first and second guide slots 100 and 102, respectively. Each of the guide slots 100 and 102 has a length which is substantially equal to the distance of stroke of the pause push-button 92 (FIG. 1) so that the slide plate 98 is longitudinally movable through a distance substantially equal to the distance of stroke of the particular push-button between a first longitudinal limit position closest to the front end plate 12 (FIG. 1) with the first and second stationary guide pins 104 and 106 respectively located at the rearmost ends of the first and second guide slots 100 and 102 as shown in FIG. 3 and a second longitudinal limit position remotest from the front end plate 12 with the pins 104 and 106 respectively located at the foremost ends of the slots 100 and 102 as shown in FIGS. 1, 2 and 4. The slide plate 98 is urged to move forwardly, viz., toward the first longitudinal limit position thereof by the force of the compression spring 96 retained to the pause push-button 92 (FIG. 1) and is moved toward the second longitudinal limit position thereof as indicated by arrow b' when the pause push-button 96 is depressed against the force of the spring 96. The first stationary guide pin 104 passed through the first guide slot 100 projects a suitable length over the outer face of the slide plate 98 and has a flange 108 formed at or connected to the leading end thereof.

The slide plate 98 has movably supported on the upper face thereof a locking member 110 which is formed with a circular hole 112 having a diameter larger than the diameter of the first stationary guide pin 104 and smaller than the diameter of the flange 108 of the guide pin 104, as indicated by dotted lines in FIGS. 3 and 4. The locking member 110 has the pin 104 loosely passed through the hole 112 between the upper face of the slide plate 98 and the flange 108 and is thus not only rotatable on the slide plate 98 about the center axis of the pin 104 and but tiltable in its entirety above the slide plate 98 about an axis substantially perpendicular to the center axis of the pin 104 between a level position substantially parallel with the slide plate 98 as indicated by full lines in FIG. 2 and an inclined position indicated by dotted lines in FIG. 2. The locking member 110 has integrally formed thereon or securely connected thereto first and second upstanding projections 114 and 116 substantially normal to the locking member 110. A torsion spring 118 has a helical intermediate portion connected to the first stationary guide pin 104 and interposed between the locking member 110 and the flange 108 of the guide pin 104 and substantially straight free end portion elastically received on one side edge of the second projection 116 the other end portion of the torsion spring 118 being received on the chassis 10. The locking member 110 is, thus, urged to hold the above mentioned level position shown by the full lines in FIG. 2 and to turn about the center axis of the guide pin 104 counter-clockwise in FIG. 3 as indicated by arrow c toward a predetermined limit angular position limited by a stop 129 fixedly mounted on the slide plate 98.

The locking member 110 is formed with first and second recessed edge portions 120 and 122 which are discrete from each other across a protuberant edge portion 124, each of the recessed edge portions forming an approximately V shaped notch. The second recessed edge 122 is located remoter from the first stationary guide pin 104 than the first recessed edge portion 120 and is angularly spaced apart from the first recessed edge portion through the protuberant edge portion 124, as shown in FIGS. 3 and 4. The notches thus formed by the first and second recessed edge portions 120 and 122 have respective bottoms which are located in a common vertical plane containing the center axis of the guide pin 104 and which are spaced apart from each other a distance substantially equal to the length of each of the guide slots 100 and 102 in the slide plate 98. The locking member 110 further has a raised tongue portion 126 having a side edge which extends from the bottom of the notch formed by the second recessed edge portion 122 away from the first stationary guide pin 104 as shown in FIGS. 3 and 4. The tongue portion 126 is raised from the plane of the upper face of the remaining portion of the locking member 110 over the slide plate 98 as will be best seen in FIG. 2. The slide plate 98 has further fixedly mounted thereon a locking pin 128 which projects substantially perpendicularly from the upper face of the plate 98 and which is located between the first and second guide slots 100 and 102. The locking member 110 is engageable with the locking pin 128 at its first or second recessed edge portion 120 or 122 depending upon the longitudinal position of the slide plate 98 relative to the first and second stationary guide pins 104 and 106 or at its protuberant edge portion 124 depending upon the angular position of the locking member 110 about the center axis of the first stationary guide pin 104. When the slide plate 98 is held in the previously mentioned first longitudinal limit position thereof with the first and second stationary guide pins 104 and 106 located at the rearmost ends of the first and second guide slots 100 and 102, respectively, as illustrated in FIG. 3, the locking member 110 assumes about the center axis of the first stationary guide pin 104 a first angular position having its first recessed edge portion 120 in pressing engagement with the locking pin 128 at the bottom of the notch formed by the edge portion 120 by the force of the torsion spring 118. The above mentioned first angular position is the previously described predetermined limit angular position of the locking member 110 urged to turn about the center axis of the guide pin 104 in the direction of the arrow c by the force of the torsion spring 118. When the slide plate 98 is moved in the direction of the arrow b' from the first longitudinal limit position thereof with the phase push-button 92 depressed against the force of the associated compression spring 96 (FIG. 1), the locking pin 128 is caused to slide on the first recessed edge portion 120 toward the protuberant edge portion 124 of the locking member 110, which is consequently forced to turn about the center axis of the first stationary guide pin 104 clockwise of FIG. 3 as indicated by arrow c' from the above mentioned first angular position against the opposing force of the torsion spring 118. When the locking pin 128 on the slide plate 98 reaches the leading end of the protuberant edge portion 124 between the first and second recessed edge portions 120 and 122 of the locking member 110 though not shown in the drawings, the locking member 110 assumes about the center axis of the guide pin 104 a second angular position which is the limit angular position of the locking member 110 rotatable about the axis of the pin 104 in the direction of the arrow c'. As the slide plate 98 is further moved rearwardly in the direction of the arrow b' and is about to reach the previously mentioned second longitudinal limit position thereof, the locking pin 128 is moved past the leading end of the protuberant edge portion 124 of the locking member 110, which as a consequence is rapidly turned about the center axis of the first stationary guide pin 104 in the direction of the arrow c by the force of the torsion spring 118. The locking pin 128 is now located at the bottom of the notch formed by the second recessed edge portion 122 of the locking member 110 and is received on the above mentioned side edge of the raised tongue portion 126 of the locking member 110, provided the locking member 110 is not in the previously described inclined position thereof. The locking member 110 is thus in engagement with the locking pin 128 at the particular side edge of its raised tongue portion 126 as illustrated in FIG. 4 and assumes about the center axis of the first stationary guide pin 104 a third angular position which is substantially coincident, about the axis of the pin 104, with the previously described first angular position of the locking member 10. When the locking member 110 is held in the third angular position thereof, the second recessed edge portion 122 of the locking member 110 extends substantially perpendicularly to the longitudinal direction of the slide plate 98, which is accordingly locked in the second longitudinal limit position thereof as indicated in FIG. 4.

If an external force is substantially perpendicularly applied as indicated by arrow F in FIG. 2 to the first upstanding projection 114 of the locking member 110 which is held in the above described third angular position thereof, the projection 114 is forced to tilt slightly downwardly about an axis substantially perpendicular to the center axis of the first stationary guide pin 104 through an angle which is dictated by the allowance of the hole 112 in the locking member 110 with respect to the diameter of the pin 104. This causes the locking member 110 to move in its entirety into the previously mentioned inclined position having the raised tongue portion 126 moved upwardly over the upper face of the slide plate 98 to such a height as to be located above and accordingly unengageable with the locking pin 128. The angle of inclination of the locking member 110 (or, in other words, the difference between the diameters of the hole 112 in the locking member 110 and the first stationary guide pin 104), the height of the raised tongue portion 126 over the upper face of the remaining portion of the locking member 110 and the length of the guide pin 104 above the upper face of the slide plate 98 are, thus, predetermined in such a manner that the length of the pin 104 above the upper face of the slide plate 98 is slightly less than the spacing between the upper face of the slide plate 98 and the lower face of the raised tongue portion 126 of the locking member 110.

When the raised tongue portion 126 of the locking member 110 is thus moved upwardly above the locking pin 128 and is consequently disengaged from the pin 128, the slide plate 98 is unlocked from the locking member 110 and is therefore allowed to move back from the second lingitudinal limit position shown in FIG. 4 backwardly toward the first longitudinal position shown in FIG. 3 in the direction of the arrow b by the force of the compression spring 96 on the pause push-button 92 (FIG. 1). When the slide plate 98 is thus being moved in the direction of the arrow b, the locking member 110 is held substantially stationary relative to the chassis 10 because the third angular position thereof is substantially coincident, about the center axis of the guide pin 104, with the first angular position of the locking member 110 and accordingly with the previously mentioned limit angular position of the locking member 110 as dictated by the torsion spring 118. The locking pin 128 on the slide plate 98 is therefore in sliding contact at its upper end with the lower face of the locking member 110 when the slide plate 98 is being moved from the first longitudinal limit position toward the first longitudinal limit position thereof. To assure and/or accelerate the movement of the slide plate 98 thus initiated upon termination of the locking engagement between the slide plate 98 and the locking member 110 and to reinforce the biasing force of the compression spring 96 on the pause push-button 92 (FIG. 1), there may be provided suitable additional biasing means such as a helical tension spring 130 which is shown anchored at one end to the second stationary guide pin 106 on the chassis 10 and at the other end to a spring retaining pin 132 which is fixedly mounted on the upper face of a rearmost end portion of the slide plate 98, urging the slide plate 98 forwardly, viz., in the direction of the arrow $b$ in cooperation with the compression spring 96 on the pause push-button 92 (FIG. 1). When the slide plate 98 thus moved in the direction of the arrow $b$ reaches the first longitudinal limit position, the locking pin 128 is located at the bottom of the V-shaped notch formed by the first recessed edge portion 120 of the locking member 128 as shown in FIG. 3 and thus the locking means including the slide plate 98 and the locking member 128 resume the initial conditions.

The locking means is cooperative with a tape-drive mechanism including a movable plate 300 which is positioned above the upper or inner face of the chassis 10 and rearwardly of the latch plate 54 as shown in FIG. 1 and which is secured to the push rod 36 connected to the playback push-button 28, the movable plate 300 being thus movable forwardly and rearwardly over the upper or inner face of the chassis 10 together with the push rod 36. As is customary, the movable plate 300 has mounted thereon a transducer head 301 which is arranged to be capable of being in contact with a travelling portion 302 of a cassette tape when the movable plate 300 is held in the rear-most position thereof with the playback push-button 28 depressed as shown in FIG. 1. A pressing roller 303 is rotatably mounted on one arm portion of a roller actuating lever 304 which has an intermediate fulcrum portion pivoted on the movable plate 300 by a pin 305. The roller actuating lever 304 has another arm portion pivotally connected at its leading end to the above described slide plate 98. The movable plate 300 has formed in its rear portion a recess within which is located a capstan 306 with which the pressing roller 303 on the movable plate 300 is to be brought into pressing engagement across the travelling portion 303 of the cassette tape when the movable plate 300 is moved into the above mentioned rearmost position thereof, provided the pause push-button 92 is held in its forwardly retracted position having the slide plate 98 maintained in the first longitudinal limit position thereof. When the pause push-button 92 is depressed and as a consequence the slide plate 98 is moved rearwardly from the first longitudinal limit position thereof as previously described, the roller actuating lever 304 is driven to turn counterclockwise in FIG. 1 about the pin 305 with the result that, even though the movable plate 300 may be in the rearmost position thereof with the playback push-button 28 kept depressed, the pressing roller 303 on the lever 304 is disengaged from the capstan 306. When playback push-button 28 is depressed with the pause push-button 92 kept released, the movable plate 300 is held in the rearmost position thereof and the slide plate 98 is held in the first longitudinal limit position thereof.

Under these conditions, the pressing roller 303 is brought into pressing contact with the capstan 306 and, as a consequence, the magnetic-tape sound recorder is ready to operate for a preselected mode of operation such as, by way of example, the recording mode of operation with the record and playback push-buttons 22 and 28 depressed as shown in FIG. 1.

The automatic start and shut-off apparatus embodying the present invention further comprises motion translating means adapted to convert the linear movement of the slide plate 98 of the above described locking means into a suitable angular motion with respect to the latch plate 54 forming part of the previously described mode-selecting and selected-mode holding means illustrated in FIG. 1. The motion translating means comprises a guide plate 134 upstanding substantially perpendicularly from one side edge of a rearmost end portion of the slide plate 98 as will be seen from FIGS. 1 and 2. The guide plate 134 has an edge portion 136 having an upper face slanting rearwardly downwardly from the rearmost end of the upper edge of the guide.

Figure 5:
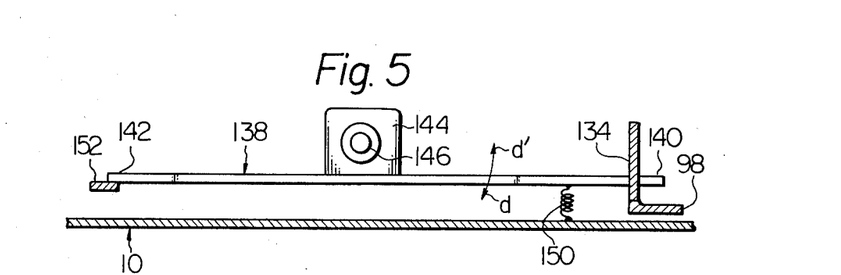
FIG. 5 is a front view of motion translating means forming part of the embodiment of FIG. 1 as viewed in directions indicated by arrows V and VI in FIG. 1, the motion translating means being shown to be in a condition consonant with the inoperative condition of the locking means shown in FIG. 2.
Figure 6:
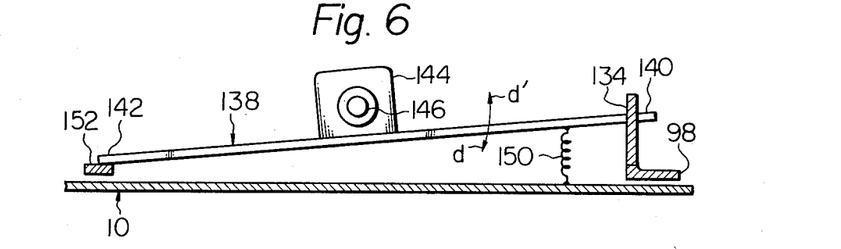
FIG. 6 is a view similar to FIG. 5 but shows the motion translating means in a condition consonant with the operative condition of the locking means illustrated in FIG. 4.

Referring to FIGS. 5 and 6 as well as to FIGS. 1 to 4, the motion translating means further comprises an elongated lever 138 having first and second longitudinal end portions 140 and 142 and extending substantially normally to the direction of movement of the slide plate 98. The elongated lever 138 has fixedly mounted on its intermediate longitudinal portion a pair of spaced parallel brackets 144 and 144' (FIG. 1) which are rotatably mounted on a cantilever shaft 146. The cantilever shaft 146 extends over the inner or upper face of the chassis 10 substantially in parallel with the direction of movement of the slide plate 98 and is fixedly connected to a suitable stationary support structure or member 148 which is fast on or forms part of the chassis 10 as shown in FIG. 1. The lever 138 is engageable at the first longitudinal end portion 140 thereof with the downwardly slanting edge 136 of the guide plate 134 and is urged to turn about the center axis of the cantilever shaft 146 clockwise in FIGS. 5 and 6 as indicated by arrow $d$ by suitable biasing means such as a helical tension spring 150 which is shown anchored at one end to the upper face of the chassis 10 and at the other end to a suitable portion between the first longitudinal end portion 140 and the above mentioned intermediate longitudinal portion of the lever 138. The first longitudinal end portion 140 of the lever 138 is therefore urged to move downwardly over the upper face of the chassis 10 and is held in pressing but slidable contact with the downwardly slanting edge 136 of the guide plate 134 on the slide plate 98 so that the angular position of the lever 138 about the center axis of the cantilever shaft 146 is variable depending upon the position of the first longitudinal end portion 140 of the lever 138 relative to the edge 136 of the guide lever 134 and accordingly upon the longitudinal position of the slide plate 98 relative to the front end plate 12 of the chassis 10 (FIG. 1). When, thus, the slide plate 98 is in the first longitudinal limit position thereof with the pause push-button 92 held in the retracted foremost position thereof as shown in FIG. 1, the guide plate 134 is held in a position closest to the front end plate 12 so that the lever 138 assumes about the center axis of the shaft 146 a first angular position having its end longitudinal end portion 140 held in a lowermost position relative to the guide plate 134, as shown in FIG. 5. As is further seen in FIG. 5, the lever 138 is assumed to extend substantially in parallel with the upper face of the chassis 10 when held in the above mentioned first angular position thereof. When, on the other hand, the pause pushbutton 92 is depressed so as to move the slide plate 98 is moved toward the second longitudinal limit position thereof, the guide plate 134 is rearwardly moved toward a position remotest front the end plate 12 so that the first longitudinal end portion 140 is caused to slide upwardly on the slanting edge 136 of the guide plate 134 against the force of the tension spring 150 with the result that the lever 138 in its entirety is turned about the center axis of the cantilever shaft 146 counter-clockwise in FIG. 5 as indicated by arrow *d'*. When the slide plate 98 reaches the second longitudinal limit position thereof and accordingly the guide plate 134 reaches the position remotest from the front end plate 12 as shown in FIG. 1, the first longitudinal end portion 140 of the lever 138 is moved into an uppermost position relative to the guide plate 134 so that the lever 138 assumes about the center axis of the shaft 146 a second angular position illustrated in FIG. 6. The lever 138 is turned back into the first angular position when the slide plate 98 is moved from the second lingitudinal limit position into the first longitudinal limit position thereof.

The automatic start and shut-off apparatus embodying the present invention further comprises unlatching means operatively connected between the hereinbefore described motion translating means and mode-selecting and selected-mode holding means for releasing the mode of operation selected in the latter when actuated after the locking conditions established in the locking means is released. The unlatching means comprises an elongated lever 152 extending substantially perpendicularly to the lever 138, viz., substantially in parallel with the direction of movement of the slide plate 98. The lever 152 has a rearmost end portion 154 engageable with the lower face of the second end portion 142 of the lever 138 of the above described motion translating means and a foremost end portion 156 located to be engageable with the upstanding edge portion 82 of the latch plate 54, as will be seen in FIGS. 7 and 8 as well as FIG. 1. The lever 152 is formed with a hole 158 in its intermediate longitudinal portion and is mounted through the hole 158 on a shaft 160 projecting perpendicularly from the upper face of the chassis 10 and having a flange 162 at its upper end. The shaft 160 has a lower axial portion received in a sleeve 164 fixedly mounted on the chassis 10 so that the intermediate longitudinal portion of the lever 152 is constantly elevated over the upper face of the chassis 10 as will be seen in FIGS. 7 and 8. The hole 158 in the lever 152 is slightly larger in diameter than the shaft 160 passed through the hole 158 so that the lever 152 as a whole is not only rotatable about the center axis of the shaft 160 in directions indicated by *e* and *e'* in FIG. 1 but tiltable between a level position shown in FIG. 7 and an inclined position shown in FIG. 8 in the directions of arrows *f* and *f'* about an axis substantially perpendicular to the center axis of the shaft 160 through an angle which is dictated by the difference between the respective diameters of the hole 158 and the shaft 160. The lever 152 is urged to turn in the direction of the arrow *f* and to maintain the level position shown in FIG. 7 by suitable biasing means such as a helical compression spring 166 which is shown seated at one end on the lower end of the flange 162 and at the other on the upper end of the sleev 164 for pressing the intermediate longitudinal portion of the lever 152 onto the sleeve 164. The lever 152 is further urged to turn about the center axis of the shaft 160 in the direction of the arrow *e*, viz., in a direction to have the foremost end portion 156 of the lever 152 to move substantially perpendicclarly away from the outer face of the upstanding edge portion 82 of the latch plate 54 by biasing means shown comprising a helical tension spring 168 which is anchored at one end to a pin 170 mounted on a portion between the foremost end portion 156 and the above mentioned intermediate longitudinal portion of the lever 152 and at the other end to a suitable stationary member or structure 172 which is fixedly mounted on or forms part of the chassis 10, as seen in FIG. 1. The rotation of the lever 152 thus urged to turn in the direction of the arrow *e* by the tension spring 168 is limited by a stop element 173 fixedly mounted on the chassis 10 and located to be engageable with the outer side edge of the foremost end portion 156 of the lever 152 irrespective of the angular position of the lever 152 about the above mentioned axis which is substantially perpendicular to the center axis of the shaft 160, as will be seen from FIGS. 7 and 8. The second end portion 142 of the lever 138 of the previously described motion translating means has its lower face in slidable contact with the upper face of the rearmost end portion 154 of the lever 152 of the unlatching means so that the rearmost end portion 154 of the latter lever 152 is urged downwardly and accordingly the lever 152 in its entirety is urged toward the previously mentioned inclined position thereof against the force of the compression spring 166 on the shaft 160 by reason of the force which is exerted on the lever 138 of the motion translating means by the tension spring 150 acting on to the lever 138. When the lever 152 is held in the inclined position, the foremost end portion 156 thereof is located higher than the upper end of the upstanding edge portion 82 of the latch plate 54 so that the lever 152 is not engageable with the edge portion 82 even though the lever 152 is turned in the direction of the arrow *e'*.

The apparatus embodying the present invention further comprises unlocking means operatively connected between the hereinbefore described unlatching means and locking means for releasing the locking conditions established in the latter when actuated. As illustrated in FIG. 1, such locking means comprises an elongated actuating rod 174 and a bell-crank lever 176 having a fulcrum portion rotatably mounted on a shaft 178 projecting substantially perpendicularly from the upper face of the chassis 10. The bell-crank lever 176 further has first and second arm portions 180 and 182 which project from the above mentioned fulcrum portion substantially in parallel with the upper face of the chassis 10 and which are angularly spaced apart from each other about the center axis of the shaft 178. The actuating rod 174 is pivotally connected at one end to a pin 184 on a portion between the rearmost end portion 154 and the previously mentioned intermediate longitudinal portion of the lever 152 of the unlatching means and at the other end to a pin 186 on the first arm portion of the bell-crank lever 176. When the lever 152 is turned about the center axis of the shaft 160 in the directions of the arrows *e* and *e'*, the bell-crank lever 176 is turned by the actuating rod 174 about the center axis of the shaft 178 in the directions which are indicated by *h* and *h'*, respectively, in FIG. 1. The bell-crank lever 176 is located in the neighborhood of the locking member 110, on the slide plate 98 of the locking means and has the second arm portion 182 arranged to be engageable with the first upstanding projection 114 of the locking member 110. When the lever 152 of the unlatching means is held in the angular position engaging the stop element 173 by the force of the tension spring 168 anchored thereto, the bell-crank lever 176 assumes an angular position having the second arm portion 182 slightly spaced apart from the inner face of the first upstanding projection 114 of the locking member 110, which is accordingly allowed to stay in the level position thereof as indicated by the full lines in FIG. 2 by the force of the compression spring 118 acting on the locking member 110. The bell-crank lever 176 is urged to turn in the direction of the arrow h by suitable biasing means such as a helical tension spring 188 which is shown anchored at one end to a spring retaining pin 190 on the second arm portion 182 of the bell-crank lever 176 and at the other end to a suitable stationary member or structure 192 which is fixedly connected to or forms part of the chassis 10. The rotation of the bell-crank lever 176 thus urged to turn in the direction of the arrow h is limited by means of a stop element 193 which is fixedly mounted on the chassis 10 and which is located to be engageable with the outer side edge of the second arm portion 182 of the bell-crank lever 176.

Figure 7:
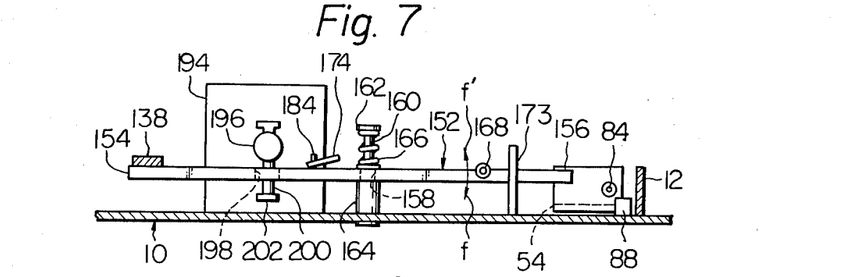
FIG. 7 is a side elevational view of unlatching means forming part of the embodiment of FIG. 1 as viewed in directions indicated by arrows VII and VIII in FIG. 1, the unlatching means being illustrated to be in a condition consonant with the condition of the motion translating means shown in FIG. 5.
Figure 8:
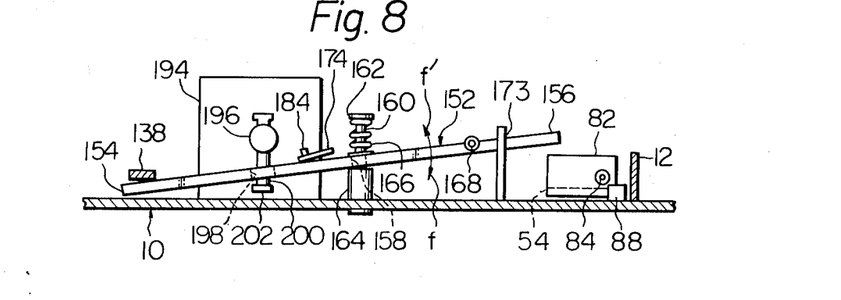
FIG. 8 is a view similar to FIG. 7 but shows the unlatching means in a condition consonant with the condition of the motion translating means illustrated in FIG. 6.

The hereinbefore described unlatching means and unlocking means are operatively connected to drive means which comprises, as illustrated in FIG. 1, a solenoid-operated actuator 194 having a plunger 196 connected to the solenoid core (not shown) of the actuator 194. The plunger 196 extends substantially perpendicularly over a portion between the rearmost end portion 154 and the previously mentioned longitudinal intermediate longitudinal portion of the lever 152 of the unlatching means. The plunger 196 is axially movable forwardly and backwardly as indicated by arrows h and h', respectively, over the upper face of the chassis 10. The lever 152 has formed in its portion below the leading end portion of the plunger 196 a slot 198 which is elongated in the longitudinal direction of the lever 152 and which is open at upper and lower ends of the lever, as indicated by dotted lines in FIGS. 7 and 8. A connecting rod 200 projects downwardly from the leading end portion of the plunger 196 and is loosely passed through the slot 198 in the lever 152 so that the lever 152 is tiltable in the directions of the arrows $f$ and $f'$ as indicated in FIGS. 7 and 8 without being interfered with by the plunger 196 and, furthermore, the linear movement of the plunger 196 is converted into rotational motion of the lever 152 about the center axis of the shaft 160 without respect to the inclination of the lever about the axis perpendicular to the center axis of the shaft 160. The connecting rod 200 has a flange 202 at its lower end projecting below the slot 198 in the lever 152 so that the lever 152 is prevented from being disengaged from the connecting rod 200. The solenoid-operated actuator 194 has a solenoid coil (not shown in FIG. 1) connected to a control circuit adapted to produce a first output signal at a desired point of time which is pre-set on a suitable time switch (not shown) for starting a desired mode of operation in the sound recorder and a second output signal in response to stoppage of the travel of a magnetic tape which has been wound on the take-up reel from the pay-off reel, as will be described in more detail. The solenoid-operated actuator 194 is, thus, arranged to have the plunger 196 moved forwardly and backwardly as indicated by the arrows $g$ and $g'$ when the solenoid coil incorporated in the actuator 194 is de-energized and energized, respectively, under the control of the above mentioned first and second output signals from the control circuit the details of which will be described later.

The operation of the automatic start and shut-off apparatus embodying the present invention thus constructed and arranged will be hereinafter described with concurrent reference to FIGS. 1 to 8. For the sake of convenience of description to follow, it will be assumed that the sound recorder is utilized in the recording mode of operation to be automatically started at a preset timing. The recording mode of operation is achieved with both of the record and playback push-buttons 22 and 28 of the mode-selecting and selected-mode holding means concurrently depressed, as previously described.

Before the record and playback push-buttons 22 and 28 are to be depressed, it is necessary to have the pause push-button 92 depressed against the force of the compression spring 96 on the push-button 92 and the force of the tension spring 130 anchored to the slide plate 98 of the locking means. When the pause pushbutton 92 is thus depressed, the slide plate 98 is moved from the first longitudinal limit position thereof rearwardly as indicated by arrow $b'$ by the rod 94 interconnecting the push-button 92 and the slide plate 98. As the slide plate 98 is moved rearwardly, the locking pin 128 which has been in engagement with the locking member 110 at the bottom of the first recessed edge portion 120 of the locking member 110 as indicated in FIG. 3 is caused to slide on the edge portion 120 toward the protuberant edge portion 124 of the locking member 110. This causes the locking member 110 to turn about the center axis of the first stationary guide pin 104 in the direction of the arrow $c'$ in FIG. 3 from the first angular position thereof against the force of the torsion spring 118. When the locking pin 128 reaches the leading end of the protuberant edge portion 124 of the locking member 110, the locking member 110 assumes the second angular position about the center axis of the pin 104 though not shown in the drawings. As the slide plate 98 is further moved rearwardly, the locking pin 128 is moved past the leading end of the protuberant edge portion 124 of the locking member 110 and is moved at a stroke into the notch formed between the second recessed edge portion 122 and the raised tongue portion 126 of the locking member 110 as shown in FIG. 4 by the force of the torsion spring 118, assuming the third angular position which is substantially identical with the first angular position thereof about the center axis of the stationary guide pin 104. When the locking member 110 is thus moved into the third angular position, the first and second stationary guide pins 104 and 106 on the chassis 10 are located at the foremost ends of the elongated guide slots 100 and 102, respectively, in the slide plate 98. The slide plate 98 is now held in the second longitudinal limit position against the force of the compression spring 96 on the pause push-button 92 and the force of the tension spring 130 on the slide plate 98 so that the pressing roller 303 engageable with the capstan 306 for driving the reels (not shown) of the cassette magnetic-tape installed in the sound recorder is spaced apart from the capstan and at the same time all the operational components and parts of the recorder are held in locked conditions. Under these conditions, the lever 138 of the motion translating means has the first longitudinal end portion 140 thereof received on an uppermost end portion of the downwardly slanting edge 136 of the guide plate 134 on the slide plate 98 and, accordingly, the lever 138 it its entirety is held in the inclined position about the center axis of the shaft 146 against the force of the tension spring 150 anchored to the lever 138 as shown in FIG. 6. The second longitudinal end portion 142 of the lever 138 is therefore held in the downwardly inclined position and maintains the lever 152 of the unlatching means in the inclined position thereof about an axis substantially perpendicular to the center axis of the shaft 160 as illustrated in FIG. 8 against the force of the helical spring 166 on the shaft 160. The lever 152 is, furthermore, held in engagement with the stop element 173 by the force of the tension spring 168 anchored thereto as shown in FIG. 1 and, thus, assumes about the center axis of the shaft 160 a first angular position which is the limit angular position of the lever 152 which is urged to turn in the direction of the arrow e by the tension spring 168. When the lever 152 is held in the inclined position about the axis substantially perpendicular to the center axis of the shaft 160 as illustrated in FIG. 8, the foremost end portion 156 of the lever 152 is located higher than the upper end of the upstanding edge portion 82 of the latch plate 54 and is not engageable with the edge portion 82 even though the lever 152 might be turned in the direction of the arrow e' (FIG. 1) about the center axis of the shaft 160.

After the pause push-button 92 is depressed and accordingly the above described conditions are established in the magnetic-tape sound recorder, a desired time at which the recording operation is to be started is set on the time switch electrically connected between a suitable power source and the solenoid coil in the solenoid-operated actuator 194 through the previously mentioned control circuit. The record and playback push-buttons 22 and 28 are thereafter depressed so as to make the sound recorder to be ready to automatically start the recording operation at the particular timing which is pre-set on the time switch. When the record and playback push-buttons 22 and 28 are thus depressed, the latch plate 54 is first moved in the direction of the arrow a' from the first longitudinal limit position into the second longitudinal limit position thereof and has the retainer portions 64 and 70 thereof engaged by the respective push rods 30 and 36 on the push-buttons 22 and 28. The latch plate 54 is thereafter moved in the direction of the arrow a back into the first longitudinal limit position thereof by the force of the tension spring 84 and has the respective push rods 30 and 36 on the record and playback push-buttons 22 and 28 held in locking engagement with the retainer portions 64 and 70, respectively, thereof.

Upon lapse of the predetermined period of time preset on the time switch, the control circuit connected between the time switch and the solenoid coil in the solenoid-operated actuator 194 delivers the first output signal and energizes the coil in the actuator 194. The plunger 196 of the actuator 194 is now caused to move rearwardly in the direction of the arrow g' and causes the lever 152 of the unlatching means to turn in the direction of the arrow e' about the center axis of the shaft 160 against the force of the tension spring 168. The rotational motion of the lever 152 is transmitted by the actuating rod 174 to the bell-crank lever 176 of the unlocking means and the bell-crank lever 176 is driven to turn in the direction of the arrow h' about the center axis of the shaft 178 against the force of the tension spring 188. The second arm portion 182 of the bell-crank lever 176 is now brought into pressing engagement with the inner face of the first upward projection 114 of the locking member 110 so that the projection 114 is turned slightly downwardly and forwardly over the slide plate 198 about an axis substantially perpendicular to the center axis of the guide pin 104. The locking member 110 in its entirety is consequently turned into the inclined position as indicated by the dotted lines in FIG. 2 against the force of the torsion spring 118 and has the raised tongue portion 126 moved upwardly over the upper face of the slide plate 98 and disengaged from the locking pin 128 which has been held in contact with the previously mentioned side edge of the raised tongue portion 126. The slide plate 98 is thus unlocked from the locking member 110 and is allowed to be moved forwardly from the second longitudinal limit position back into the first longitudinal limit position thereof by the force of the compression spring 96 on the pause push-button 92 and the force of the tension spring 130 on the slide plate 98. The lever 152 turned in the direction of the arrow e' about the center axis of the shaft 160 is maintained in the inclined position about the axis perpendicular to the center axis of the shaft 160 and is, therefore, unengageable at its foremost end portion 156 with the upstanding edge portion 82 of the latch plate 54 as shown in FIG. 8 until the slide plate 98 is moved back into the first longitudinal limit position. The latch plate 54 is therefore held in the second longitudinal limit position thereof with the lever 152 held in the first angular rotational motion. As the slide plate 98 is moved back toward the first longitudinal limit position thereof as above described, the guide plate 134 thereon is also moved forwardly so that the first longitudinal end portion 140 of the lever 138 forming part of the motion translating means is caused to downwardly slide on the slanting edge 136 of the guide plate 134 by the force of the tension spring 150 anchored to the lever 138. When, thus, the slide plate 98 reaches the first longitudinal limit position thereof, the first longitudinal end portion 140 of the lever 138 is received on a lowermost end portion of the downwardly slanting edge 136 of the guide plate 134 and as a consequence the lever 138 in its entirety is turned in the direction of the arrow d about the center axis of the shaft 146 and assumes the previously mentioned level position indicated in FIG. 5. It therefore follows that the second longitudinal end portion 142 of the lever 138 and accordingly the rearmost end portion 154 of the lever 152 of the unlatching means are moved upwardly over the upper face of the chassis 10 so that the lever 152 in its entirety is allowed to assume the level position thereof as illustrated in FIG. 7 by the force of the compression spring 166 on the shaft 160 supporting the lever 152. The lever 152 is now ready to be brought into engagement with the upstanding edge portion 82 of the latch plate 54.

The slide plate 98 having been unlocked from the locking member 110 and moved back into the first longitudinal limit position thereof, the pressing roller 303 associated with the capstan 306 forming part of the tape drive mechanism of the recorder is now brought into pressing engagement with the capstan and 306 across that portion of the cassette tape which extends between the pay-off and take-up reels of the tape cassette (not shown) which is installed in the recorder. Simultaneously as these take place, all the other operational components and parts of the recorder are made operative to produce the recording mode of operation in the recorder with the record and playback push-buttons 22 and 28 preliminarily depressed. The recording operation is started with the magnetic tape in the tape cassette travelling from the pay-off reel to the take-up reel of the cassette. When the recording operation is thus started, the coil in the solenoid-operated actuator 194 is de-energized so that the plunger 196 of the actuator 194 is axially moved forwardly and allows the lever 152 of the unlatching means to turn in the direction of the arrow e about the center axis of the shaft 160 until the lever 152 is brought into abutting engagement with the stop element 173.

At the instant the magnetic tape initially wound on the pay-off reel of the tape cassette is completely unwound and the reels are brought to a full stop, the control circuit connected to the solenoid coil in the solenoid-operated actuator 194 delivers the previously mentioned second output signal thereof and energizes the coil. The plunger 196 of the actuator 194 is therefore caused to retract in the direction of the arrow g' and drives the lever 152 of the unlatching means to turn about the center axis of the shaft 160 in the direction of the arrow e' against the force of the tension spring 168 for a second time. The foremost end portion 156 of the lever 152 is thus moved toward and brought into pressing contact with the outer face of the upstanding edge portion 82 of the latch plate 54 which has been held in the first longitudinal limit position having the retainer portions 64 and 70 thereof in locking engagement with the push rods 30 and 36, respectively, which are connected to the record and playback pushbuttons 22 and 28 in the depressed conditions. This causes the latch plate 54 to move in the direction of the arrow a' from the first longitudinal limit position into the second longitudinal limit position thereof against the force of the tension spring 84 with the result that the respective push rods 30 and 36 on the record and playback push-buttons 22 and 28 are disengaged from the retainer portions 64 and 70, respectively, of the latch plate 54. The record and playback push-buttons 22 and 28 are thus allowed to retract into the foremost positions thereof by the forces of the compression springs 38 and 44, respectively, acting thereon and at the same time the latch plate 54 is allowed to move back into the first longitudinal limit position thereof by the force of the tension spring 84 with the lever 152 turned back in the direction of the arrow e about the center axis of the shaft 160 by the force of the tension spring 168 and with the plunger 196 of the solenoid-operated actuator 194 allowed to move axially forwardly into the initial position thereof.

Figure 9:
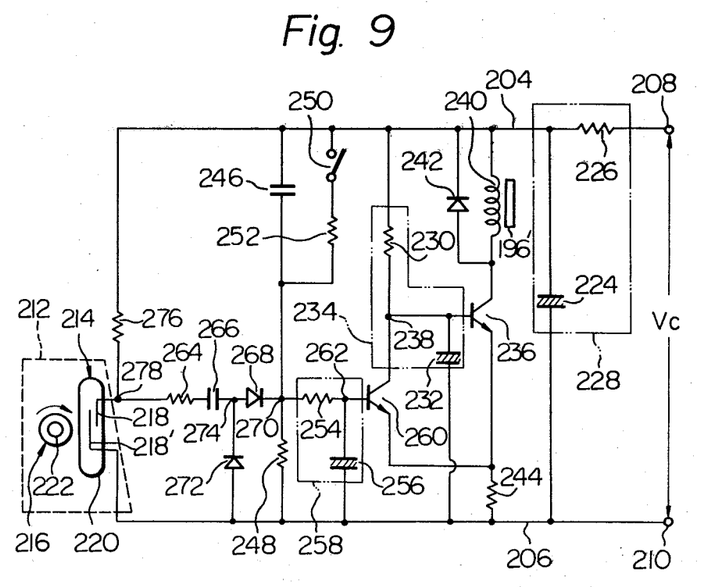
FIG. 9 is a diagram showing a preferred example of an electric control circuit for use in the embodiment illustrated in FIGS. 1 to 8.

FIG. 9 illustrates a preferred example of the control circuit adapted to deliver the previously described first and second output signals at a pre-set timing at which the recording or any other desired mode of operation is to be automatically started and in response to stoppage of the travel of the magnetic tape between the pay-off and take-up reels in the tape cassette installed in the magnatic-tape sound recorder incorporating the hereinbefore described means.

Referring to FIG. 9, the control circuit for use in a magnetic-tape sound recorder embodying the present invention comprises positive and negative bus lines 204 adn 206 which are connected to terminals 208 and 210, respectively. Though not shown in FIG. 9, the terminals 208 and 210 in turn are connected to a constantvoltage d.c. power source or supply circuit through a series combination of a suitable time switch and a power-supply switch adapted to be closed when any of the record, rewind, fast-forward and playback push-buttons 22, 24, 26 and 28 of the previously described mode-selecting and selected-mode holding means is depressed. As illustrated, the control circuit further comprises an end-of-tape detecting unit 212 which is shown, by way of example, to be composed of a reed relay 214 and a magnetic rotor 216. The reed relay 214 comprises a pair of ferromagnetic reeds 218 and 218' which are enclosed in a gas-tight glass tube 220 filled with an inert gas and which are adapted to be in contact with each other when positioned in a magnetic field, as is well known in the art. On the other hand, the magnetic rotor 216 has a permanent magnet (not shown) embedded therein and is mounted on a shaft 222 which is rotatable with the reels in the magnetic-tape cassette installed in the sound recorder. The magnetic rotor 216 is located in the vicinity of the reed relay 214 so that an alternating current is induced through the reeds 218 and 218' of the relay 214 when the magnetic rotor 216 is driven for rotation with the shaft 222 during operation, in any mode, of the sound recorder. The reeds 218 and 218' of the relay 214 thus arranged are connected to the positive and negative bus lines 204 and 206, respectively, as shown. Between the positive and negative bus lines 204 and 206 is further connected a first capacitor 224. A first resistor 226 is connected between the positive bus line 204 and the terminal thereof. The capacitor 224 and the resistor 226 constitute in combination a first resistance-capacitance network 228 having a predetermined time constant $T_1$. Between the positive and negative bus lines 204 and 206 is further connected a series combination of a second resistor 230 and a second capacitor 232, constituting a second resistance-capacitance network 234 having a predetermined time constant $T_2$ which is larger than the time constant $T_1$ of the above described first resistance-capacitance network 228. A first transistor 236 of the n-p-n type has its base connected to a node 238 between these resistor 230 and capacitor 232 constituting the second resistance-capacitance network 234. The collector of the first transistor 236 is connected to the positive bus line 204 through a parallel combination of a coil 240 and a diode 242 which is directed to have its anode terminal connected to the collector of the transistor 236 and its cathode terminal connected to the positive bus line 204. The coil 240 is constituted by the solenoid coil incorporated in the previously described solenoid-operated actuator 194 shown in FIG. 1. The coil 240 is, thus, provided in association with a solenoid core 196' mechanically connected to the plunger 196 of the actuator 194. The emitter of the first transistor 236 is connected through a third resistor 244 to the negative bus line 206.

Between the positive and negative bus lines 204 and 206 is further connected a series combination of a third capacitor 246 and a fourth resistor 248. The third capacitor 246 is shunted by a series combination of a switch 250 and a fifth resistor 252 and likewise the fourth resistor 248 is shunted by a series combination of a sixth resistor 254 and a fourth capacitor 256. The combination of the sixth resistor 254 and the fourth capacitor 256 constitutes a third resistance-capacitance network 258 which has a predetermined time constant $T_3$ larger than the time constant $T_2$ of the above described second resistance-capacitance network 234. The switch 250 is mechanically connected to the previously described locking means and is arranged to be closed when the pause push-button 92 (FIG.1) is depressed and accordingly the locking conditions are established between the slide plate 98 and the locking member 110. A second transistor 260 of the n-p-n type has its base connected to a node 262 between the above mentioned resistor 254 and capacitor 256 constituting the third resistance-capacitance network 258. The collector of the second transistor 260 is connected to the node 238 between the resistor 230 and capacitor 232 constituting the previously described second resistance-capacitance network 234 and accordingly to the base of the first transistor 236. The emitter of the second transistor 260 is connected, in parallel with the emitter of the first transistor 236, to the negative bus line 206 through the third resistor 244.

The reed 218 of the previously described reed relay 214 is connected through a series combination of a seventh resistor 264, a fifth capacitor 266 and a second diode 268 to a node 270 between the third capacitor 246, fourth resistor 248 and fourth capacitor 256 with the diode 268 directed to have its anode terminal serially connected through the resistor 264 and the capacitor 266 to the reed 218 and its cathode terminal connected to the node 270. A third diode 272 has its anode terminal connected to the bus line 206 and its cathode terminal connected to a node 274 between the above mentioned fifth capacitor 266 and second diode 268. The reed 218 is further connected through an eighth resistor 276 to the positive bus line 204.

When, in operation, one or more of the record, rewind, fast-forward drive and playback push-buttons 22, 24, 26 and 28 in the mode-selecting and selected-mode holding means shown in FIG. 1 is or are depressed to produce a desired mode of operation in the sound recorder with the pause push-button 92 kept released, viz., the locking means held in the inoperative condition thereof, the previously mentioned power-supply switch (not shown) connected between the terminals 208 and 210 through the time switch and the constant-voltage d.c. power source or supply circuit is closed so that, when the time switch is closed, a constant voltage Vc appears between the terminals 208 and 210 and charges the first capacitor 224 through the first resistor 226. At an incipient stage after the voltage Vc is thus produced between the positive and negative bus lines 204 and 206, the terminal voltage of the second capacitor 232 connected to the base of the first transistor 236 remains lower than the base saturation voltage of the transistor 236 because of the fact that the time constant $T_2$ of the second resistance-capacitance network 234 is larger than the time constant $T_1$ of the first resistance-capacitance network 228 as previously noted. The first transistor 236 is therefore kept non-conductive and accordingly the solenoid coil 240 remains de-energized for a certain period of time after the voltage Vc is produced between the positive and negative bus lines 204 and 206. On the other hand, the reed relay 214 of the end-of-tape detecting unit 212 starts to produce an alternating current as soon as the voltage Vc is built up between the positive and negative bus lines 204 and 206 with any one or more of the push-buttons 22, 24, 26 and 28 (FIG. 1) depressed. The alternating current is rectified by the second and third diodes 268 and 272 so that a certain d.c. voltage is superposed on the voltage appearing at the node 270 through the third capacitor 246. It therefore follows that the potential at the node 262 between the resistor 254 and capacitor 256 constituting the third resistance-capacitance network 258 reaches a level capable of turning on the second transistor 260 in a short while after the voltage Vc has appeared between the positive and negative bus lines 204 and 206, in spite of the fact that the time constant $T_3$ of the third resistance-capacitance network 258 is larger than the time constant $T_2$ of the second resistance-capacitance network 234. The second transistor 260 being thus made conductive, the potential at the base of the first transistor 236 is reduced to such a level that can not produce a conduction state in the first transistor 236, which as a consequence is maintained non-conductive throughout the operation of the sound recorder. Thus, the solenoid coil 240 is kept de-energized and accordingly the solenoid-operated actuator 194 (FIG. 1) is maintained inoperative throughout the operation of the sound recorder as long as the switch 250 is kept open as long as the pause push-button 92 (FIG. 1) is held released.

At the instant the tape which has been travelling from the pay-off reel to the take-up reel of the tape cassete is brought to a stop, the magnetic rotor 216 of the end-of-tape detecting unit 212 comes to a standstill so that the reed relay 214 ceases production of the alternating current. This results in a drop in the voltage at the node 270 between the third capacitor 246 and the third resistance-capacitance network 258 and causes the second teansistor 260 to turn off. The first transistor 236 is thus made conductive and completes the circuit between the positive and negative bus lines 204 and 206 through the solenoid coil 240 and the third resistor 244. The solenoid coil 240 is now energized and excites the associated solenoid core 196'. The solenoid-operated actuator 194 is initiated into motion to drive the lever 152 of the unlatching means shown in FIG. 1 and clears the mode of operation which has been established in the sound recorder. The previously mentioned power supply switch connected between the terminals 208 and 210 is automatically made open and the sound recorder is brought to a full stop.

The hereinbefore described operation of the sound recorder incorporating the control circuit of FIG. 9 is achieved when the time switch is kept closed throughout the operation or the recorder is used for an ordinary purpose without putting such a switch to use. Where the time switch serially connected with the power-supply switch between the terminals 208 and 210 is set to close at a scheduled timing after the power-supply switch has been closed with the pause push-button 92 depressed to establish the locking conditions in the sound recorder, there is no voltage produced between the terminals 208 and 210 of the control circuit shown in FIG. 9 pending the lapse of the time duration in which the time switch is kept open. When the time switch is allowed to close upon lapse of the time duration, the voltage Vc appears between the terminals 208 and 210 and rapidly charges the first capacitor 224. With the pause push-button 92 held in the depressed position, the switch 250 is kept closed so that a voltage is impressed on the base of the second transistor 260 through the switch 250 and the fifth and sixth resistors 252 and 254. Because, in this instance, of the fact the time constant $T_3$ of the third resistance-capacitance network 258 constituted by the resistor 254 and capacitor 256 is larger than the time constant $T_2$ of the resistance-capacitance network 234 constituted by the resistor 230 and capacitor 232 as previously noted, the second transistor 260 can not be made conductive before the first transistor 236 turns on. The first transistor 236 is thus made conductive and accordingly the solenoid coil 240 is energized from the first capacitor 224 soon after the volatge Vc has appeared between the terminals 208 and 210. The solenoid-operated actuator 194 shown in FIG. 1 is therefore initiated into motion to drive the lever 152 of the unlatching means for clearing the locking conditions which have been established with the pause push-button 92 depressed. After the solenoid coil 240 is once energized, the solenoid coil 240 can not be energized again at least for a time duration corresponding to the time constant $T_1$ of the first resistance-capacitance network 228, viz., unti the first capacitor 224 is fully charged for a second time. The sound recorder is now started for a desired mode of operation which is herein assumed to be the recording mode of operation. The magnetic tape in the tape cassete being thus driven to travel from the pay-off reel to the take-up reel, the magnetic rotor 216 of the end-of-tape detecting unit 212 starts to rotate with the reels and accordingly the reed relay 214 starts to produce the alternating current as previously described. With the pause push button 92 (FIG. 1) thus retracted from the depressed position, the switch 250 is made open so that the voltage between the bus lines 204 and 206 flows through the third capacitor 246 bypassing the switch 250. The d.c. voltage resulting from the alternating current which is rectified by the second and third diodes 268 and 272 is thus superposed on the voltage appearing at the node 270 through the third capacitor 246, establishing a conduction state in the second transistor 260 and thereby making the first transistor 236 non-conductive. This takes place before the first capacitor 224 is fully charged by the voltage Vc, viz., within the period of time corresponding to the time constant $T_1$ of the first resistance-capacitance network 228 constituted by the capacitor 224 and resistor 226 with the result that the solenoid coil 240 is kept de-energized after the same has once been energized at the point of time pre-set on the time switch and until the end-of-tape detecting unit 212 ceases to deliver the output current at the end of the recording operation.

While the solenoid core 196' has been assumed to be directly connected to the plunger 196 of the solenoid-operated actuator 194 shown in FIG. 1, the solenoid core 196' may be mechanically connected to any drive means or members connected to the plunger 196 or to any member engageable with the unlatching means shown in FIG. 1.

Furthermore, the magnetic-tape sound recorder incorporating the automatic start and shut-off apparatus embodying the present invention has been hereinbefore assumed to be of the cassette type but it will be apparent that the features of the present invention are applicable to any other types of magnetic-tape sound recorders of, for example, the magazine types if desired.

What is claimed is:

1. An automatic start and shut-off apparatus for a magnetic-tape sound recorder having a plurality of modes of operation and including component members having operative conditions for selectively effecting each of said modes of operation and manually-operable, mode-selecting and selected-mode holding means for selecting a desired one of said modes of operation and actuating said component members to effect the selected mode of operation, said means having a first condition operative to hold the selected mode of operation and a second condition clearing the selected mode of operation, comprising locking means operable independently of said mode-selecting and selected-mode holding means and shiftable manually into an operative condition locking said component members in inoperative conditions thereof and shiftable automatically into an inoperative condition releasing the inoperative conditions of the component members, unlatching means having a first condition engageable with said mode-selecting and selected-mode holding means and a second condition unengageable with the mode-selecting and selected-mode holding means, motion translating means intervening between said locking means and said unlatching means and operative to convert the inoperative and operative conditions of the locking means into the first and second conditions, respectively, of the unlatching means, unlocking means intervening between said locking means and said unlatching means and having an operative condition producing in said locking means the inoperative condition thereof and an inoperative condition allowing the locking means to hold the operative condition thereof, said unlatching means being shiftable irrespectively of said first and second conditions thereof and independently of said motion translating means between an operative condition producing in said unlocking means the operative condition thereof and an inoperative condition producing in the unlocking means the inoperative condition thereof, said unlatching means being in engagement with said mode-selecting and selected-mode holding means for shifting the mode-selecting and selected-mode holding means from the first condition to the second condition thereof when the unlatching means in said first condition is shifted from said inoperative condition thereof to said operative condition thereof, and power-operated actuating means drivingly connected to said unlatching means and operative to selectively produce the operative and inoperative conditions of the unlatching means irrespectively of the first and second conditions of the unlatching means.

2. An apparatus as set forth in claim 1, in which said locking means comprises a slide plate movable between a first longitudinal limit position holding said operational members in unlocked conditions and a second longitudinal limit position holding the operational members in said locked conditions, a locking member which is rotatable on said slide plate about a fixed axis substantially perpendicular to the direction of movement of the slide plate between the first and second longitudinal limit positions thereof and which is tiltable between a level position and an inclined position over said slide plate about an axis which is substantially perpendicular to said fixed axis, the locking member in the level position over the slide plate in the first longitudinal limit position having an unlocking angular position about said fixed axis for allowing the slide plate to move out of the first longitudinal limit position thereof and producing in said locking means said inoperative condition thereof, the locking member in the level position over the slide plate in said second longitudinal limit position having a locking angular position about said fixed axis for being in locking engagement with the slide plate and producing in said locking means said operative condition thereof, and the locking member in said inclined position over the slide plate in the second longitudinal limit position allowing the slide plate to be unlocked from the locking member and to move from the second longitudinal limit position into the first longitudinal limit position thereof, and biasing means urging said slide plate to move toward the first longitudinal limit position thereof.

3. An apparatus as set forth in claim 2, in which said slide plate is formed with a slot elongated in the direction of movement of the slide plate, the slide plate in the first and second longitudinal limit positions having said fixed axis located in proximity to the longitudinal ends, respectively, of said slot, said locking member formed with first and second recessed edge portions respectively forming notches therein, a protuberant edge portion separating the notches from each other and a tongue portion raised over the slide plate and having a side edge projecting from said second recessed edge portion for defining one end of the notch formed by said second recessed edge portion, said slide plate having fixedly mounted thereon a pin engageable with any of said first and second recessed edge portions and said edge of said tongue portion of the locking member depending upon the angular position of the locking member about said fixed axis when the locking member is in said level position, the locking member having about the fixed axis a first angular position having said pin located at the bottom of the notch formed by said first recessed edge portion, a second angular position having the located at the leading end of said protuberant edge portion and a third angular position having the pin located at the bottom of the notch formed by said second recessed edge portion and received on said edge of said tongue portion, said first angular position of the locking member being assumed when said slide plate is in said first longitudinal limit position and corresponding to said unlocking angular position of the locking member and said third angular position of the locking member being assumed when the slide plate is in said second longitudinal limit position thereof and corresponding to said locking angular position of the locking member, the locking member in said inclined position allowing said pin to move substantially freely relative to the locking member when said slide plate is being moved from the second longitudinal position toward the first longitudinal limit position for having said pin moved from the bottom of the notch formed by said second recessed edge portion toward the bottom of the notch formed by said first recessed edge portion, said locking means further comprising biasing means urging said locking means to turn toward the first and third angular positions and away from said second angular position thereof about said fixed axis.

4. An apparatus as set forth in claim 2, in which said motion translating means comprises a guide plate movable with said slide plate and having a slanting edge on a plane substantially parallel with the direction of movement of the slide plate, a lever which is rotatable about a fixed axis substantially parallel with said plane and which has one longitudinal end portion in slidable engagement with the slanting edge of said guide plate, said longitudinal end portion of the lever being laterally slidable on the slanting edge of said guide plate between opposite longitudinal end portions of the slanting plate and accordingly said lever in its entirety being rotatable about the fixed axis of rotation thereof between first and second angular positions responsive to the movement of said slide plate between the first and second longitudinal limit positions, respectively, thereof, said lever having the other longitudinal end portion in engagement with said unlatching means for producing in the unlatching means the first and second conditions thereof when turned into said first and second angular positions thereof, and biasing means urging said lever to turn toward said first angular position thereof about said fixed axis of rotation thereof.

5. An apparatus as set forth in claim 4, in which said unlatching means comprises a lever which is rotatable about a fixed axis between angular positions respectively producing in the unlatching means the operative and inoperative conditions thereof and which is tiltable about an axis substantially perpendicular to the fixed axis of rotation thereof between first and second angular positions producing in the unlatching means the first and second conditions, respectively, thereof, said lever of the unlatching means having one longitudinal end portion being in engagement with said other longitudinal end portion of said lever of said motion translating means for being turned into the first and second angular positions thereof responsive to the rotational motion of the lever of the motion translating means into the first and second angular positions, respectively, thereof, the lever of the unlatching means having the other longitudinal end portion engageable with said mode-selecting and selected-mode holding means for producing in the mode-selecting and selected-mode holding means the first and second conditions thereof when held in the first angular position thereof and turned about said fixed axis of rotation thereof into the angular position producing said operative condition of the unlatching means, first biasing means urging said lever of the unlatching means to turn about the fixed axis of rotation thereof toward said angular position producing said inoperative condition of the unlatching means, and second biasing means urging said lever of the unlatching means to turn about the axis substantially perpendicular to the fixed axis of rotation thereof toward said first angular position thereof.

6. An apparatus as set forth in claim 5, in which said unlocking means comprises an actuating member pivotally connected to a portion of the lever of said unlatching means between said fixed axis of rotation and said one longitudinal end portion thereof, a bell-crank lever rotatable about a fixed axis substantially parallel with the fixed axis of rotation of the lever of said unlatching means, the bell-crank lever having a first arm portion pivotally connected to said actuating member and a second arm portion engageable with said locking member in a relationship to move the locking member into said inclined position thereof when the second arm portion is in pressing engagement with said locking member in a direction substantially perpendicular to the fixed axis of rotation of the locking member, said bell-crank lever having about the fixed axis of rotation thereof first and second angular positions responsive to the operative and inoperative conditions, respectively, of said unlatching means and being with said locking member in said relationship thereto when turned into the first angular position thereof, and biasing means urging said bell-crank lever to turn toward said second angular position thereof about the fixed axis of rotation of the bell-crank lever.

7. An apparatus as set forth in claim 1, in which said unlatching means comprises a lever which is rotatable about a fixed axis between angular positions respectively producing in the unlatching means the operative and inoperative conditions thereof and which is tiltable about an axis substantially perpendicular to said fixed axis between angular positions respectively producing in the unlatching means the first and second conditions thereof, said lever having one longitudinal end portion engageable with said mode-selecting and selected-mode holding means and the other longitudinal end portion held in engagement with said motion translating means, first biasing means urging said lever to turn about said fixed axis toward the angular position producing in the unlatching means said inoperative condition thereof, and second biasing means urging said lever to turn about the axis substantially perpendicular to said fixed axis toward the angular position producing in the unlatching means said first condition thereof, said unlocking means being connected to said lever.

8. An apparatus as set forth in claim 1, in which said unlocking means comprises a lever rotatable about a fixed axis between first and second angular positions responsive to the operative and inoperative conditions, respectively, of said unlatching means, said lever being engageable with said locking means for producing in the locking means the operative and inoperative conditions thereof when turned into the first and second angular positions, respectively, thereof, and biasing means urging said lever to turn about said fixed axis toward the second angular position thereof.

9. An apparatus as set forth in claim 1, in which said motion translating means comprises a lever rotatable about a fixed axis between first and second angular positions responsive to the inoperative and operative conditions, respectively, of said locking means, said lever being in engagement at one end with said locking means and at the other end with said unlatching means for producing in the unlatching means the first and second conditions thereof when turned into said first and second angular positions, respectively, thereof, and biasing means urging said lever to turn about said fixed axis toward the first angular position thereof.

10. An apparatus as set forth in claim 1, in which said actuating means comprises a solenoid-operated actuator operatively connected to said unlatching means and comprising a solenoid coil associated with a solenoid core, and a control circuit responsive to a first signal by which the sound recorder is to be started for a selected mode of operation and a second signal indicative of the termination of the travel of a magnetic tape incorporated into and in operation in the sound recorder, said control circuit producing in the actuating means said operative condition thereof in response to each of the first and second signals.

11. An apparatus as set forth in claim 10, in which said control circuit comprises positive and negative bus lines connected across a d.c. power source through switch means, voltage generating means for producing a d.c. voltage responsive to travelling condition of the magnetic tape incorporated and in operation in the sound recorder, first, second and third resistance-capacitance networks connected in parallel between said positive and negative bus lines and having respective predetermined time constants, the time constant of the second resistance-capacitance network being larger than the time constant of the first resistance-capacitance network and smaller than the time constant of the third resistance-capacitance network, a first transistor serially connected through said solenoid coil between said positive and negative bus lines, said first resistance-capacitance network including a capacitor constituting a power source for the solenoid coil, said second resistance-capacitance network having an output terminal connected to the base of said first transistor, a second transistor connected through the output terminal of said second resistance-capacitance network to the base of said first transistor for establishing a non-conduction state in the first transistor when the second transistor is conductive, said third resistance-capacitance network having an output terminal connected to the base of said second transistor, and a parallel combination of a switch and a capacitor connected between said bus lines, said switch being closed and open in response to the operative and inoperative conditions, respectively, of said locking means, the output terminal of said voltage generating means and the input terminal of said third resistance-capacitance network being connnected to the positive bus lines across said parallel combination of said capacitor and said switch.

12. An apparatus as set forth in claim 11, in which said voltage generating means comprises an end-of-tape detecting unit operative to produce an a.c. current responsive to the travelling movement of said magnetic tape, and a rectifier unit for producing at said output terminal of the voltage generating means a d.c. voltage from said a.c. current.

13. An apparatus as set forth in claim 12, in which said end-of-tape detecting unit comprises a magnetic rotor rotatable with the reels carrying said magnetic tape and a reed relay positioned in the vicinity of said magnetic rotor and including ferromagnetic contact elements respectively connected to said positive and negative bus lines and across said rectifier circuit.

* * * * *